United States Patent [19]

Talley

[11] Patent Number: 4,955,591
[45] Date of Patent: Sep. 11, 1990

[54] SINGLE PIECE WEDGE CLAMP

[76] Inventor: William Talley, Rte. 5, Box 567, Breaux Bridge, La. 70517

[21] Appl. No.: 408,999

[22] Filed: Sep. 18, 1989

[51] Int. Cl.⁵ .............................................. B25B 5/08
[52] U.S. Cl. ............................ 269/217; 269/254 R; 24/555
[58] Field of Search ............... 267/158, 160, 181; 248/316.5, 316.7; 294/99.1, 99.2; 24/545, 546, 555, 561, 562; 269/254 R, 217, 53

[56] References Cited

U.S. PATENT DOCUMENTS

| 865,623 | 9/1907 | Wood | 269/254 R |
| 1,049,803 | 1/1913 | Boyer | 269/254 R |
| 2,487,997 | 11/1949 | West | 269/254 |
| 2,668,342 | 2/1954 | Nelsson | 24/561 |
| 2,763,915 | 9/1956 | Morgan | 269/254 R |
| 3,003,215 | 10/1961 | Fernberg | 24/562 |
| 3,754,307 | 8/1973 | Froehlich | 24/555 |
| 4,858,285 | 8/1989 | Dala et al. | 24/555 |
| 4,858,408 | 8/1989 | Dunn | 24/562 |
| 4,858,980 | 8/1987 | Dreisig et al. | 24/545 |

Primary Examiner—Robert C. Watson
Attorney, Agent, or Firm—Dowell & Dowell

[57] ABSTRACT

A clamp having a pointed first fixed jaw which is integrally formed with a handle portion and an opposing second fixed jaw wherein the opposing jaw includes an arcuate tapering clamping surface such that the clamping surface of the opposing jaw is moved progressively closer to the first fixed jaw by a relative rotation of the clamp about the point of the first fixed jaw.

9 Claims, 1 Drawing Sheet

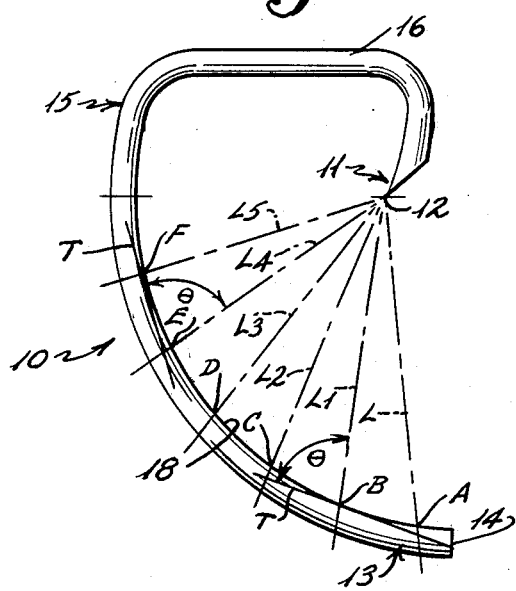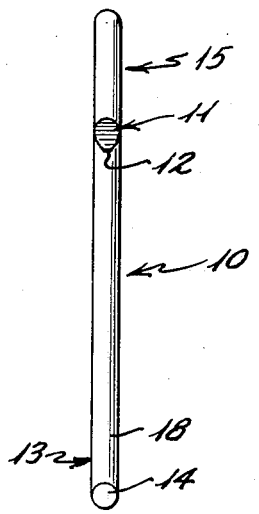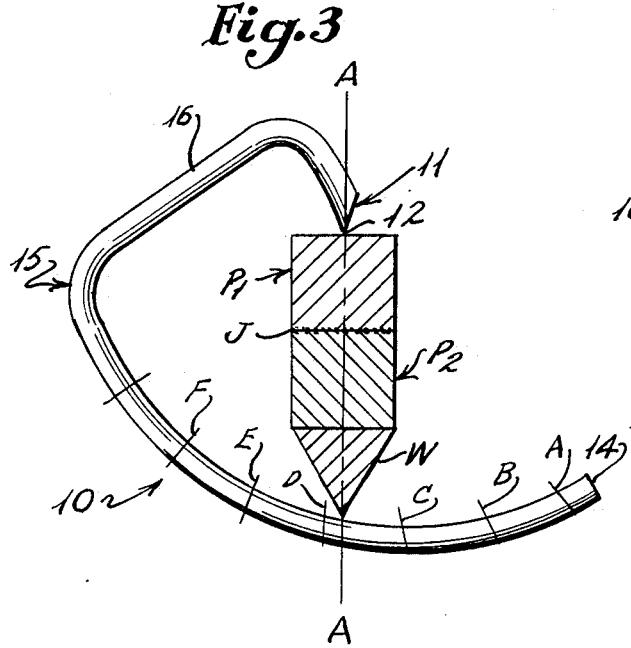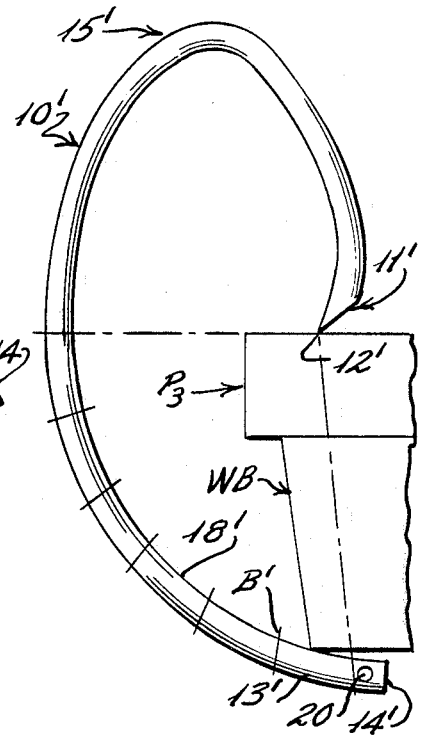

SINGLE PIECE WEDGE CLAMP

BACKGROUND OF THE INVENTION

FIELD OF THE INVENTION

This invention is generally directed to work supports and particularly to clamping devices utilized to secure a work object to a support surface or to clampingly engage separate work pieces together so as to retain such work pieces in fixed relationship with respect to one another such as when uniting such articles by applying an adhesive therebetween. More specifically, the present invention is directed to clamping devices which are integrally formed of a single piece of generally rigid material and which incorporate a first fixed jaw which is in spaced opposing relationship with respect to a second fixed jaw which includes an elongated arcuate clamping surface. The fixed jaws are united by a handle which extends upwardly and outwardly with respect to the fixed jaws so as to provide an area where manual manipulation of the clamps may be easily accomplished.

The configuration of the clamping surface of the opposing or second fixed jaw is such that as the clamp is rotated about the first fixed jaw the clamping surface will be progressively brought into closer proximity with respect to the first fixed jaw so as to thereby clampingly engage an article or work support therebetween.

HISTORY OF THE RELATED ART

Over the years there have been numerous types of clamps and vices designed for facilitating the retention or anchoring of work pieces relative to support surfaces especially utilized in wood working and metal craft shops. Such clamps are generally utilized to either retain a work piece on a surface so that the work piece may be worked upon without shifting from the surface to which it is supported. Further, such clamps may be utilized to secure separate work pieces together so as to allow adhesive applied between the work pieces to dry without the pieces being displaced relative to one another or perhaps to align the work pieces for drilling or other type of shaping or cutting.

Many prior art clamps incorporate one or more adjustable jaws Such clamps as conventional C-clamps often include a generally fixed jaw and an opposing axially moveable or adjustable jaw which may be selectively brought into closer or spaced proximity to the fixed jaw depending upon whether or not the clamp is being applied or removed relative to a work support. Although such adjustable type clamps provide benefit in allowing the clamps to be utilized with varying sizes or thicknesses of material, such devices have the disadvantage of being awkward to handle and require the use of two hands in order to be properly positioned and adjusted relative to the work or support surface. Also, the time necessary to accomplish the adjustment of such prior art clamps or vices is disruptive to the individual who is utilizing the clamping devices.

In order to facilitate the ease of application in the use of clamping devices, other clamps have been designed which utilize a pair of moveable jaws which are generally spring loaded with respect to one another and which may be mounted to handles which are positioned so as to be easily gripped by a single hand of the individual utilizing the clamps. By squeezing the handles together, the jaws of such clamps may be separated and thereafter the jaws applied to a work piece and a support surface to thereby clampingly engage the work piece to the work surface or applied on opposing sides of a pair of work pieces which are to be joined or held in fixed relationship with respect to one another. Unfortunately, such types of clamping devices frequently do not provide sufficient force to adequately secure the work pieces to the support surface or one work piece to another due to the inherent resiliency of the spring which is utilized to force the jaw elements into relative engagement with respect to one another. This is especially true when intimate contact is needed between work pieces which are being adhesively secured to one another and wherein the force applied by the spring may h=limited and these may permit air to penetrate the area between the work pieces during the drying process.

In addition to various types of work engaging clamps and vices, a number of retaining clips have also been designed for facilitating the connection of one article to another. Generally, such retaining clips offer an advantage in that the clips may be formed of a single piece of material that does not incorporate expensive moveable components and therefore significantly reduces the cost of the clips making the product more available and more economical for the individual requiring the use of such clips. Generally, such retaining clips if integrally formed take on a somewhat C-shaped configuration having a pair of opposing leg members which may be applied to either side of a work or article support surface so as to clampingly engage a work piece to the support surface with one leg element being applied to the work to be supported and the opposite leg being applied to the opposite side of the work support. U.S. Pat. No. 3,089,211 to Pereusse discloses one such prior art clip. The clip includes an elongated leg which is generally resiliently integrally connected to a lower or opposing leg with the elongated leg being designed to contact an article to be support on a work surface and with the opposing leg including a rounded portion which is designed to resiliently engage the lower portion of the support surface or perhaps bind a portion of the article to be supported relative to the opposing surface of the article support. Unfortunately, such clips are designed for generally specific uses and are of specific sizes with the clamping forces obtained being limited by the inherent resiliency of the material from which the clamping or clip devices are formed. Such clamps have the same disadvantage as the spring loaded clamps discussed above and therefore do not provide secure mountings or clamping arrangements for many uses and would not be appropriate for use for many shop working applications.

Some other types of generally single piece or integrally formed retaining clips or clamps which are designed to be generally resilient in structure are disclosed in U.S. Pat. Nos. 2,003,856 to Gimbel, 2,763,915 to Morgan, 3,252,679 to Bell and 3,994,050 to Bub.

In light of the foregoing, to date there has not been provided a one-piece easily manipulatable clamping device which can be utilized to rigidly secure a work piece either to a mounting surface or to compress the work piece against a second work piece so as to thereby retain the work pieces in fixed relationship with respect to one another and which clamping device may h=easily placed or removed without complex adjustment It is an object of the present invention to overcome the deficiencies of the prior art adjustable and spring type clips, clamps and vices and to provide clamps which may be easily applied or removed and yet which provide sufficient retaining force to insure that a work object is retained in a properly clamped position.

SUMMARY OF THE INVENTION

A one-piece clamping device which may be selectively utilized to secure a work piece to a support surface or to clampingly engage two or more work pieces in assembled relationship with respect to one another and which includes a first fixed jaw which is spaced in opposing relationship with respect to a second fixed jaw and wherein the fixed jaws are integrally connected by an outwardly extending handle. The second fixed jaw is provided with an elongated arcuate clamping surface which extends inwardly from the remote or free end thereof. The curvature of the clamping surface of the second fixed jaw relative to the first fixed jaw is such as to draw the clamping surface progressively towards the first fixed jaw as the second fixed jaw is rotated relative to the first fixed jaw whereby the amount of compressive force applied by the clamp is determined by the rotational positioning of the second fixed jaw relative to the first fixed jaw.

In a preferred embodiment of the invention, the curvature of the clamping surface of the second fixed jaw is determined by a plurality of points which extend inwardly from the remote end thereof towards the handle portion of the clamping device. If a tangent line is drawn with respect to each of the points defining the clamping surface, and if a ray or line is drawn from the first fixed jaw through each of the points along the clamping surface, an angle will be formed therebetween which is generally preferably 90° or less with degrees between 80° and 90° being preferred.

The handle of the clamping device is generally designed to extend upwardly an outwardly with respect to the first and second fixed jaws thereof to thereby facilitate the manipulation of the clamp relative to the article support surface or relative to the articles to be clamped in intimate engagement with respect to one another.

It is a primary object of the present invention to provide a one-piece clamp which may easily be applied utilizing a single hand and which is relatively adjustable so as to provide increased clamping pressure by simple rotation of the clamp relative to the article or articles being secured.

It is yet a further object of the present invention to provide a one-piece clamping device which is relatively adjustable with respect to an article to be clamped by a simple rotation of the clamp relative to the article and the article support surface without requiring an adjustment of the axial spacing of the opposing jaws of the clamping device.

It is also an object of the present invention to provide a clamping device which may be rapidly applied and rapidly removed relative to an article to be supported either on a support surface or to be united or retained relative to a second article so that the amount of time utilized or required to place or remove the clamp is retained at a minimum.

It is another object of the present invention to provide a one-piece clamp which may h=inexpensively manufactured and therefore be made economically available to wood and metal shop workers.

Another object of the present invention is that the one-piece clamp may be manufactured in various sizes so as to accomodate the clamps for various thicknesses of materials and article supports.

BRIEF DESCRIPTION OF THE DRAWINGS

FIG. 1 is a side elevational view one embodiment of the clamp of the present invention showing the tangential lines identified with points along the clamping surface of the second fixed jaw relative to rays or lines drawn through such points from the first fixed jaw.

FIG. 2 is a front plan view of the clamp of FIG. 1.

FIG. 3 is a side illustrational view showing the clamp of FIG. 1 as utilized to compressively engage a pair of work pieces into intimate relationship so as to allow adhesive material to dry therebetween.

FIG. 4 is a side elevational view of a second embodiment of the present invention wherein the handle portion is more arcuately configured than the embodiment of FIG. 1 and wherein the clamp is shown as engaging a work piece to a support surface such as the top of a work bench.

DESCRIPTION OF THE PREFERRED EMBODIMENT

With continued reference to the drawings, a first embodiment of Clamp 10 of the present invention is shown in FIGS. 1-3 with a second embodiment of Clamp 10' being shown in FIG. 4. The Clamp 10 is shown as being an integral one-piece clamp which includes a first or upper jaw 11 which is preferably tapered to a point or beveled edge 12. The point or beveled edge 12 will allow the first jaw to be selectively engaged in fixed relationship to a work piece such as shown at Pl in FIG. 3. The point or beveled edge will actually allow the clamp to dig into the surface so as to prevent accidental shifting of the jaw during the placement of the clamp.

The clamp further includes an opposing or second fixed jaw 13 which has an outermost end portion 14 which is shown in FIG. 1 as extending generally transversely with respect to a vertical line extending from the first jaw and to the second jaw. The free end should preferably either extend perpendicularly with respect to the vertical line through the beveled edge 12 of the fixed jaw or be slightly angled downwardly from such a vertical line as is generally shown in the drawings.

The fixed jaws 11 and 13 are connected by a handle portion 15 which includes a segment 16 which is extended away from the second fixed jaw 13 as is shown in FIG. 1. The shape of the handle may be varied but should be sufficient to allow the clamp to be conveniently grasped in the hand of an individual utilizing the clamp.

The second fixed jaw 13 is provided with an inner arcuate clamping surface 18 which extends from the free end 14 upwardly and outwardly towards the handle 15. The curvature defined by the clamping surface 18 is such that as the clamp is rotated in a counter clockwise direction as shown in FIG. 1, the points along the clamping surfaces indicated at A-F will be progressively moved into closer vertical proximity with respect to the fixed jaw 11. Therefore, the clamping device 10 may be utilized to secure work pieces to support surfaces or to other work pieces wherein the combined width of the work piece and the support or other work piece varies between dimensions L and L5 as also shown in FIG. 1. It should be noted that L5 is of a lesser dimension than L4 and L4 a lesser dimension than L3 and so on with dimension L being the greatest dimension.

In the preferred embodiment of the present invention, the shape of the arcuate clamping surface 18 may be defined by considering the surface to include a plurality of spaced points such as shown at A, B, C, D, E and F which extend upwardly and outwardly with respect to the end 14 of the second fixed jaw. If a tangential line T is drawn through each of the spaced points such tangential lines should form an angle $\theta$ which should generally not exceed 90° with respect to a line drawn through the point from the point 12 of the first jaw. The lines or rays are shown as being L-L5. Preferably, the angle 8 should be between 80° and 90°.

The clamp 10 is preferably made of a fairly rigid metallic material such as a quarter inch steel rod. The material may vary, however, and in some instances may incorporate other cross sectional configurations such as square or rectangular bars which are bent to conform to the shape of the present invention. In some instances, the material may exhibit some degree of resiliency in those applications where the clamping force need not remain constant but would allow some movement between the article being clamped and its support.

With specific reference to FIG. 3 of the drawings, the clamping device is shown as being utilized to secure a first work piece P1 to a second work piece P2 while an adhesive is allowed to dry therebetween. In order to assure that the force directed between P1 and P2 is axial along axis A—A a separate wedge member W is utilized and placed in contact with the lower surface of the work piece P2. The wedge member is tapered to a point which is engaged by the lower or second fixed jaw 13 of the clamping device 10. It will be noted from the drawing figure that the clamp is applied by first placing the beveled edge 12 of the fixed jaw 11 into engagement with the upper surface of the work piece P1. Thereafter, the clamp is rotated counter clockwise until a point adjacent point D along the clamping surface 18 of the fixed jaw 13 is encountered. At this point, the clamp is securely engaged compressing the wedge W towards the first fixed jaw 11. As the point of the wedge W is in line with the axis A—A, the force against work pieces P2 and P1 will be along the line of the axis and thereby insure an even compression of the joint J between the work pieces.

The clamp of FIG. 1 may also be utilized as is shown with regard to the second embodiment of Clamp 10' shown in FIG. 4. The clamp of FIG. 4 is generally identical to the clamp of FIG. 1 with the exception that the handle 15' has been formed with a different configuration which is generally more arcuate or rounded than the configuration shown in FIG. 1. Essentially, the handle configuration of the clamps of the present invention may take various forms so long as the geometrical relationship between the first jaw and the second jaw are retained and with the characteristics of the clamping surface 18 being maintained. The embodiment 10' includes the same type of first fixed jaw as the first embodiment and is shown at 11' and which also includes the beveled lower edge 12'. The second or opposing fixed jaw 13' includes an outer end 14' and an inner arcuate clamping surface 18' which is defined by the same arcuate characteristics as was discussed above with respect to the embodiment of FIGS. 1-3. In FIG. 4, the clamp is being shown as clamping a work piece P3 to a work support such as a work bench WB. The clamp is applied by first positioning the point 12' of the first fixed jaw 11' along the upper surface of the work piece P3 and thereafter rotating the clamp counter clockwise so that the clamping surface 18' of the second fixed jaw 13' is progressively drawn into closer proximity with respect to the fixed jaw 11'. As shown, in the drawings, wedging action is achieved just prior to the clamp being moved to position B'. In this position, the work piece P3 is rigidly secured and clamped to the work bench WB.

Although the clamps of the present invention are preferably made of metallic materials, in some instances, the clamps may be utilized as light weight clips by manufacturing the clamps from various types of plastic materials. Further, to facilitate storage, the clamps may be provided with one or more openings such as shown at 20 in FIG. 4 by which the clamps may be suspended from a support pin when not in use.

I claim:

1. A clamping device for clamping work pieces to a work support or adjacent work pieces comprising a first fixed jaw and an opposing fixed jaw, integrally formed handled means for connecting said first fixed jaw to said opposing fixed jaw, said handle means extending outwardly with respect to an axis taken between said first fixed and said opposing fixed jaws, said opposing fixed jaw having an outermost end and inner arcuately shaped clamping surface portion, said clamping surface portion of said opposing fixed jaw being defined by a continuous series of points extending from adjacent said outermost end toward said handle which points are continuously and progressively in closer proximity to said first fixed jaw so that the straight line distance between said first fixed jaw and said clamping surface portion of said opposing fixed jaw is continuously decreased as said handle is pivoted about said first fixed jaw and toward a work piece being clamped between said first and said opposing fixed jaws, whereby, when said first fixed jaw is in contact with a first side of the work piece and said opposing fixed jaw is rotated relative to the opposite side of the work piece, said clamping surface portion of said opposing fixed jaw will be progressively brought closer to said first fixed jaw to thereby clamp the work piece therebetween.

2. The clamping device of claim 1 in which said outermost end of said opposing fixed jaw is oriented in generally perpendicular relationship with respect to said axis between said first fixed and said opposing fixed jaws.

3. The clamping device of claim 1 in which said first fixed jaw includes a positioned end.

4. The clamping device of claim 3 in which said handle means includes a portion which extends from said first fixed jaw and generally away from said opposing fixed jaw.

5. The clamping device of claim 4 in which said first fixed jaw, said handle means and said opposing fixed jaw are formed of a generally rigid material so that said first fixed jaw and said opposing fixed jaw are relatively nonyieldable with respect to one another.

6. The clamping device of claim 1 wherein said clamping surface portion of said fixed opposing jaw is arcuately curved such that a tangent line taken with respect to any of said points along said clamping surface portion of said opposing jaw is at an angle of between approximately 80° to 90° with respect to a ray extending from said first fixed jaw through each of said points.

7. The clamping device of claim 6 in which said first fixed jaw includes a pointed end.

8. The clamping device of claim 7 in which said first fixed jaw, said handle means and said opposing fixed jaw are formed of a generally rigid material so that said first fixed jaw and said opposing fixed jaw are relatively nonyieldable with respect to one another.

9. The clamping device of claim 1 in which said first fixed jaw, said handle means and said opposing fixed jaw are formed of a generally rigid material so that said first fixed jaw and said opposing fixed jaw are relatively nonyieldable with respect to one another.

* * * * *